(12) United States Patent
Ou-Yang et al.

(10) Patent No.: US 9,405,521 B2
(45) Date of Patent: Aug. 2, 2016

(54) MAPPING OF VIRTUALIZED SETUP-FREE APPLICATIONS FOR A COMPUTING SYSTEM

(75) Inventors: Darwin Ou-Yang, Redmond, WA (US); Neal R. Christensen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1656 days.

(21) Appl. No.: 11/477,842

(22) Filed: Jun. 29, 2006

(65) Prior Publication Data

US 2008/0010630 A1 Jan. 10, 2008

(51) Int. Cl.
*G06F 9/445* (2006.01)
*G06F 9/44* (2006.01)

(52) U.S. Cl.
CPC .. *G06F 8/61* (2013.01); *G06F 8/68* (2013.01); *G06F 9/44505* (2013.01); *G06F 9/44584* (2013.01); *G06F 9/44521* (2013.01)

(58) Field of Classification Search
CPC .................................................. G06F 9/44584
See application file for complete search history.

(56) References Cited

U.S. PATENT DOCUMENTS

| | | | | |
|---|---|---|---|---|
| 5,193,184 | A * | 3/1993 | Belsan et al. | 711/4 |
| 5,546,534 | A * | 8/1996 | Malcolm | 714/6.3 |
| 5,642,417 | A * | 6/1997 | Stringer | 717/174 |
| 6,115,710 | A | 9/2000 | White | |
| 6,779,035 | B1 | 8/2004 | Gbadegesin | |
| 6,868,450 | B1 | 3/2005 | Lucovsky | |
| 7,028,305 | B2 * | 4/2006 | Schaefer | 719/310 |
| 7,117,495 | B2 * | 10/2006 | Blaser et al. | 717/174 |
| 7,162,628 | B2 * | 1/2007 | Gentil et al. | 713/100 |
| 7,461,086 | B1 * | 12/2008 | Hurren et al. | |
| 7,539,828 | B2 * | 5/2009 | Lomnes | 711/163 |
| 7,600,216 | B2 * | 10/2009 | Shlomai | 717/111 |

(Continued)

OTHER PUBLICATIONS

Anonymous, "Application Virtualization, A Technical Overview of the Thinstall Application Virtualization Platform," Thinstall [online], 2005 [retrieved Sep. 23, 2014], Retrieved from Internet: <URL:http://web.archive.org/web/20051211093707/http://www.thinstall.com/products/documents/ThinstallTechnicalOverview_V1Oct05_000.pdf>, pp. 1-12.*

(Continued)

*Primary Examiner* — Todd Aguilera
(74) *Attorney, Agent, or Firm* — Sunah Lee; Judy Yee; Micky Minhas

(57) ABSTRACT

A setup-free software application and related operating techniques are described herein. The setup-free application is contained within a package file that does not appear as a program file to the computing system. When the package file is opened, the computing system virtualizes the "installation" of the setup-free application without copying application files to the actual file system and without making any modifications to the actual registry. When the setup-free application is running, operating requests (such as file read requests, registry read requests, and file write requests) are directed to the contents of the package file. Such redirection away from the actual file system and away from the actual registry enables the computing system to run the setup-free application from the package file.

18 Claims, 9 Drawing Sheets

(56) References Cited

U.S. PATENT DOCUMENTS

| | | | |
|---|---|---|---|
| 7,853,947 B2* | 12/2010 | Laborczfalvi et al. | 718/1 |
| 8,073,886 B2* | 12/2011 | Ou-Yang et al. | 707/831 |
| 2002/0174215 A1* | 11/2002 | Schaefer | 709/224 |
| 2003/0233490 A1* | 12/2003 | Blaser et al. | 709/328 |
| 2004/0045016 A1* | 3/2004 | Romm et al. | 719/328 |
| 2004/0088681 A1 | 5/2004 | Berg et al. | |
| 2004/0139309 A1* | 7/2004 | Gentil et al. | 713/1 |
| 2004/0143586 A1 | 7/2004 | Chung | |
| 2004/0220982 A1 | 11/2004 | Probert, Jr. et al. | |
| 2005/0091449 A1 | 4/2005 | Cherian | |
| 2005/0114870 A1* | 5/2005 | Song et al. | 719/328 |
| 2005/0132251 A1 | 6/2005 | Denissen et al. | |
| 2005/0240918 A1* | 10/2005 | Shlomai | 717/162 |
| 2006/0218165 A1* | 9/2006 | Vries | G06F 21/6218 |
| 2007/0162510 A1* | 7/2007 | Lenzmeier | G06F 17/30233 |

OTHER PUBLICATIONS

"device, n.", OED Online, Oxford University Press, 1989 [retrieved Feb. 9, 2015], Retrieved from Internet: <URL:http://www.oed.com/oed2/00062593>, pp. 1-6.*

Anonymous, "Windows Explorer—A definition", Kephyr.com [online], 2005 [retrieved Dec. 8, 2015], Retrieved from Internet: <URL:https://web.archive.org/web/20050517002900/http://www.kephyr.com/spywarescanner/library/glossary/windowsexplorer.phtml>, pp. 1-2.*

"How to Install and license ALP on your machine", http://www.activelocalpages.com/enduser.asp.

Poirier; Dan, "Packaging software with RPM, Part 2", http://www-128.ibm.com/developerworks/library/l-rpm2/.

Krueger; Stefan, "Windows Installer Technical Articles", http://www.installsite.org/pages/en/msi/articles.htm.

\* cited by examiner

MAPPING OF VIRTUALIZED SETUP-FREE APPLICATIONS FOR A COMPUTING SYSTEM

BACKGROUND

Software applications have traditionally been deployed on computing machines by a setup or installation program that copies application files onto the system and manipulates shared configuration stores such as the registry. This model may have some shortcomings, depending upon the system configuration, the operating environment, and the application. For example, multiple installs and uninstalls of software applications can lead to the accumulation of "cruft" or undesired code fragments on the system, which may cause the operating system to become slower and less stable. In addition, multiple applications may need to share common files or components, which can cause instability when such applications have file version collisions. In addition, some shared components, which are installed and registered for one application on the system, become available to all applications (including a web browser) installed on the system. This can increase the attack surface of the system and further expose the system to hostile web pages and other threats. Moreover, application upgrades and changes can be difficult to manage. For example, such upgrades and changes may require synchronized changes to many files and registry entries. Consequently, setup programs tend to be complex in nature. In this regard, setup programs typically maintain installation logs and system restore features that enable them to rollback failed partial installs.

A portable memory device such as a flash memory stick may be utilized to store an application intended for execution on a system. The memory device includes application execution files and a virtual registry file of a software application such that, after the memory device is mounted to the computing machine, the application stored in the portable memory device can be executed. This technique utilizes application program interface (API) hooks that map all of the API calls of the operating system to access the files resident in the portable memory device. This effectively creates a temporary drive (for example, the D:\ drive) from which the application executes. This approach is undesirable because such API hooking may not be supported by the operating system, and there may be no well-defined interface for doing API hooking, which can result in unpredictable behavior if more than one application attempts API hooking. API hooking is also a technique commonly used by malicious software, therefore, operating systems may be designed to make it very difficult or impossible to hook APIs.

BRIEF SUMMARY

The techniques and technologies described herein can be utilized to virtualize the installation of a software application on a computing system. This virtualized installation enables the application to run without having to modify the registry of the computing system and without having to perform a traditional setup procedure. The application is included in a package file along with a subset of the file system and registry keys that enable the application to run from the package file. The package file is copied as-is onto the computing system, and can be quickly and easily deleted like any other file. The computing system includes a suitably configured virtualizing component that maps requests and operations that would otherwise be directed to an installed application to elements contained in the package file. This mapping function is performed without having to extract and copy files from the package file onto the computing system and without having to change any existing configuration (e.g., the registry) of the computing system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of an example embodiment may be derived by referring to the detailed description and claims when considered in conjunction with the following figures, wherein like reference numbers refer to similar elements throughout the figures.

DETAILED DESCRIPTION

Figure 1:
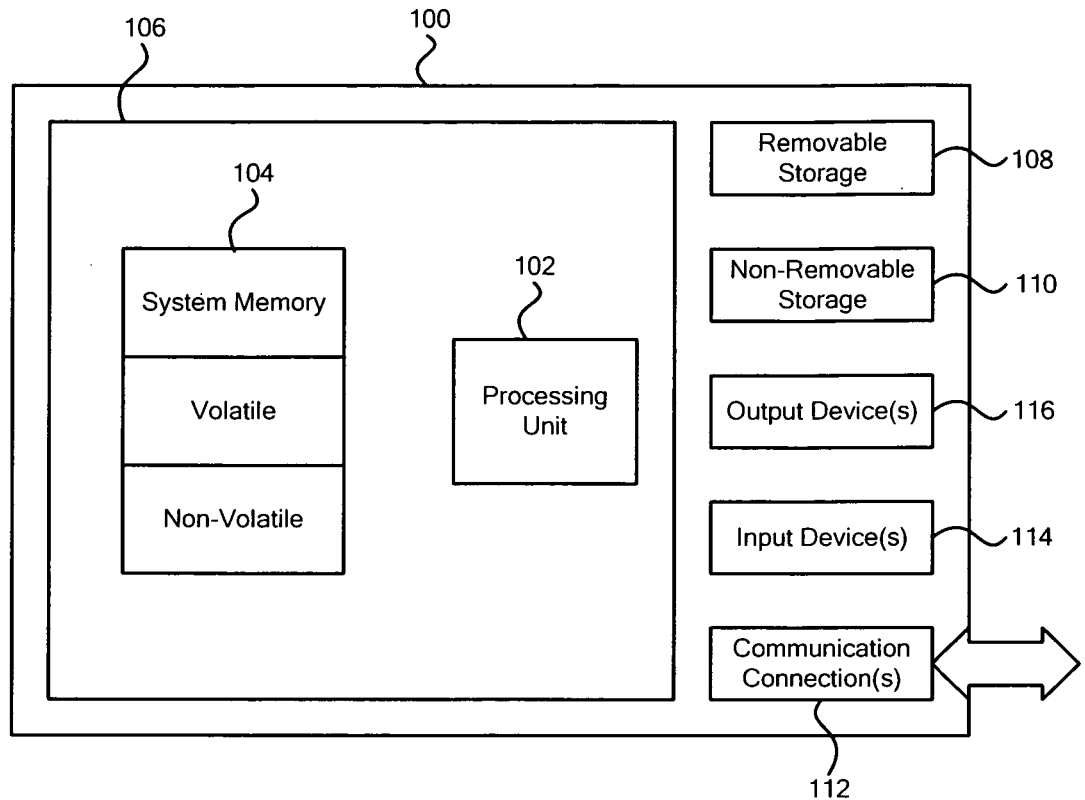
FIG. 1 is a simplified schematic representation of an example computer system for implementing an embodiment of the invention.

The following detailed description is merely illustrative in nature and is not intended to limit the embodiments described herein or the application and uses of such embodiments.

Example embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that practical embodiments may be practiced in conjunction with any number of data transmission protocols and that the system described herein is merely one example embodiment.

For the sake of brevity, conventional techniques related to computer systems and devices, computer operating systems, file system filters, computer file systems, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example embodiment.

The following description may refer to elements, nodes, or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in the figures depict example arrangements of elements, additional or fewer elements, devices, features, or components may be present in an embodiment.

As used herein, the term "install" (and its various forms) in the context of a software application refers to the copying of application files onto the actual program file system of a host computing system. Such "installations" usually involve a modification to shared configuration files of the computing system, such as modification to the actual registry of the host computing system. Moreover, such "installations" often involve replacing or upgrading an already-installed component. Components that may be involved in such "installations" include, without limitation: libraries (or DLLs), which are typically shared; COM components, which are typically shared; fonts, which are typically shared; help files; control panel applets; audio files; graphics files; HTML files; and video files.

Briefly, the techniques described herein enable a computing system to run applications without having to run a conventional setup application to actually install the application on the system itself. The computing system need not copy application files to the normal "Program Files" location on its C:\ drive and need not alter its registry to run a setup-free application as described herein. Rather, a virtualizing component (which may be a file system filter driver in one embodiment) is utilized to map a ready-to-run package file onto the computing system in a way that virtualizes an executable application contained in the package file. Using this technique, the normal setup and install procedure is eliminated and the package file can be saved anywhere on the computing system (e.g., on the displayed desktop) to enable the user to run the executable application by activating the package file. In practice, such activation may simply involve the user clicking or double-clicking on an icon that represents the package file. The application can be placed onto the computing system and run without needing any write permissions (except in the user's profile path). In this regard, the package file can be copied onto any personal profile path to enable the associated application to run from that location. Moreover, for many applications, the normal uninstall procedure can be eliminated; deletion of the package file removes the executable application contained therein and little or no traces of the executable application remain on the computing system itself.

In one embodiment, the package file includes the executable application itself, registry keys and possibly other registry elements, and versions of all necessary files that support the execution of the application (which may be organized as a subset of a file system). The application included with the package file experiences a virtualized view of the file system that can be leveraged to transparently eliminate file version conflicts with other applications while allowing the application to run against its needed dynamic link libraries (DLLs). Rebooting of the computing system is not required to replace in-use DLLs because parallel DLL versions within different package format files can coexist on the computing system. Moreover, the application perceives a virtualized view of the registry of the computing system and the application will not pollute the computing system with cruft upon deletion (where "cruft" represents configuration data or files left over from the application that were not cleaned up properly by the uninstall procedure; cruft tends to build up over time and can impair the functionality of the system). As an added benefit, such virtualized applications can reduce the attack surface of the computing system since active controls or other possibly vulnerable code can be made package-specific and, by default, isolated from applications that are actually installed on the computing system, including web browsers.

FIG. 1 is a simplified schematic representation of an example computer system 100 for implementing an embodiment of the invention. Computer system 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, personal digital assistants, mobile telephones, multiprocessor systems, microprocessor-based systems, programmable consumer electronics, network PCs, minicomputers, mainframe computers, distributed computing environments that include any of the above systems or devices, and the like.

Computer system 100 and certain aspects of embodiments of the invention may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

Computer system 100 typically includes at least some form of computer readable media. Computer readable media can be any available media that can be accessed by computer system 100 and/or by applications executed by computer system 100. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer system 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Referring again to FIG. 1, in its most basic configuration, computer system 100 typically includes at least one processing unit 102 and a suitable amount of memory 104. Depending on the exact configuration and type of computing system 100, memory 104 may be volatile (such as RAM), non-volatile (such as ROM, flash memory, etc.) or some combination of the two. This most basic configuration is identified in FIG. 1 by reference number 106. Additionally, computer system 100 may also have additional features/functionality. For example, computer system 100 may also include additional storage (removable and/or non-removable) including, but not limited to, magnetic or optical disks or tape. Such additional storage is illustrated in FIG. 1 by removable storage 108 and non-removable storage 110. Memory 104, removable storage 108, and non-removable storage 110 are all examples of computer storage media as defined above.

Computer system 100 may also contain communications connection(s) 112 that allow the system to communicate with other devices. Communications connection(s) 112 may be associated with the handling of communication media as defined above.

Computer system 100 may also include or communicate with input device(s) 114 such as a keyboard, mouse or other pointing device, pen, voice input device, touch input device, etc. Although the example embodiment described herein utilizes a mouse device, embodiments of the invention can be equivalently configured to support a trackball device, a joystick device, a touchpad device, or any type of pointing device. Computer system 100 may also include or communicate with output device(s) 116 such as a display, speakers, printer, or the like. All of these devices are well know in the art and need not be discussed at length here.

Package File

Figure 2:
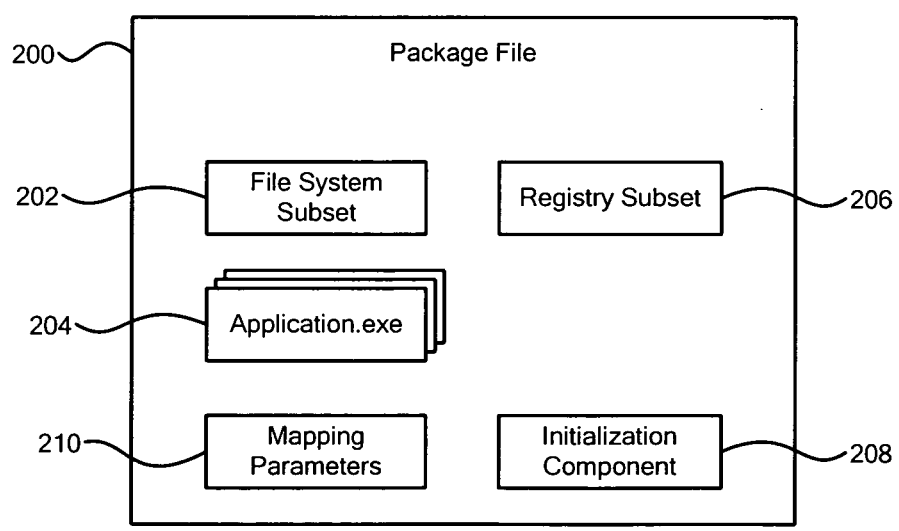
FIG. 2 is a schematic representation of a package file suitable for use with a setup-free software application.

FIG. 2 is a schematic representation of a package file 200 suitable for use with a setup-free software application as described in more detail herein. Package file 200 represents a "container" or "grouping" mechanism for a number of files, elements, or software components. Package file 200 may be of any suitable format. For example, package file 200 may be configured in accordance with any of the following file formats (without limitation): WIM, ZIP, or CAB. Notably, package file 200 is configured such that it appears as a non-program file to the actual file system of the computing system. For this simplified depiction, package file 200 includes a subset of a file system 202, at least one executable application file 204 (identified as application.exe), a subset of a registry 206, an initialization file or component 208, and mapping parameters 210. Of course, package file 200 may also include additional files, elements, or software components as needed, and the contents shown in FIG. 2 are not intended to limit or otherwise restrict the scope or application of the package file 200.

The file system subset 202 represents a portion of the file system (file system elements) that will be utilized by executable application file 204. File system subset 202 may include a suitably organized directory, along with the files for the setup-free application, positioned in appropriate locations necessary for the expected operation of executable application file 204. This enables the host computing system to virtualize executable application file 204 without having to run a conventional setup application. File system subset 202 enables the use of executable application file 204 without requiring the user to have administrator privileges because the actual program files directory on the host computing system need not be modified at all. Instead, when package file 200 is opened, it maps itself into the actual program files directory. Depending upon the particular implementation, the mapping may only exist for the duration of time that executable application file 204 is running. For reasons explained in more detail below, one need not have prior knowledge of the actual file system residing on the hard drive of the host computing system to design and populate package file 200.

Package file 200 may contain any number of different executable application files 204. For example, package file 200 may contain a suite of related applications (e.g., a word processing application, a spread sheet application, and a presentation creation application). For the sake of simplicity, the following description assumes that package file 200 contains a single executable application file 204. Executable application file 204 represents any software application that can be virtualized and mapped in the manner described herein. Although not a requirement, executable application file 204 can be distributed with package file 200 and run as-is; there is no installation process intended or required for executable application file 204 to operate, and executable application file 204 need not be extracted or removed from package file 200. Rather, executable application file 204 can be virtually installed on the host computing system only for the duration of time that it is actually running from within package file 200. In other embodiments, the file system mappings for executable application file 204 may be retained by the host computing system.

In a practical deployment, executable application file 204 may be a relatively self-contained and simple application that need not be continuously running on the host computing system. Moreover, the code for executable application file 204 need not be modified for compatibility with the setup-free technique described herein. In other words, the same program code for a traditionally installed version of executable application file 204 can be contained in package file 200. Non-limiting examples of such applications include: system utility applications; word processor applications; spread sheet applications; web-based games; web browser applications; web-based training or diagnostic applications; or the like. Although not a requirement, applications that do not rely on or communicate with other applications, and applications that do not intend to expose APIs or functionality to other applications, are particularly suitable for use in this context.

Registry subset 206 represents a portion of the registry, with registry keys pre-populated in appropriate locations. This is conceptually similar to file system subset 202; package 200 includes information utilized by the host computing system such that it can virtualize the actual registry and establish the necessary mappings to registry keys contained in package file 200.

Mapping parameters 210 may also be included in package file 200 to facilitate the virtualization of the file system, the registry, and executable application file 204 by the host computing system. The host computing system can read mapping parameters 210, and amend or alter them as needed to ensure proper handling of package file 200 and proper running of executable application file 204. Mapping parameters 210 represent information that can be passed to a virtualizing component in the host computing system. In this regard, mapping parameters 210 identify files, registry keys, and other items in package file 200 that will be virtualized to support the operation of executable application file 204. Thus, mapping parameters 210 can be utilized to temporarily configure the virtualizing component, and the functionality of the virtualizing component is influenced by mapping parameters 210. When package file 200 is activated, the virtualizing component operates in response to mapping parameters 210 to allow the host computing system to run executable application 204 in a setup-free manner. In one embodiment, the mapping is entirely set forth within package file 200, and executable application file 204 need not be aware that it has been virtualized for running outside the realm of the actual file system of the computing system.

In addition, a suitably written initialization file or component 208 can be utilized to describe which executable file to launch when package file 200 is activated. Although not a requirement, an autorun information file (autorun.inf) or any suitably configured element may be utilized for this component. Initialization component 208 may be included in package file 200 to enable the operating system of the host computing system to run executable application file 204 when package file 200 is opened. Initialization component 208 may be associated with the root directory of package file 200. This initialization component 208 identifies executable application file 204 to the shell (i.e., the user interface of the host computing device that displays icons that represent available program files), thus enabling the host computing system to launch executable application file 204 whenever package file 200 is opened. This allows the shell to determine which paths should be mapped, and where to map those paths.

Figure 3:
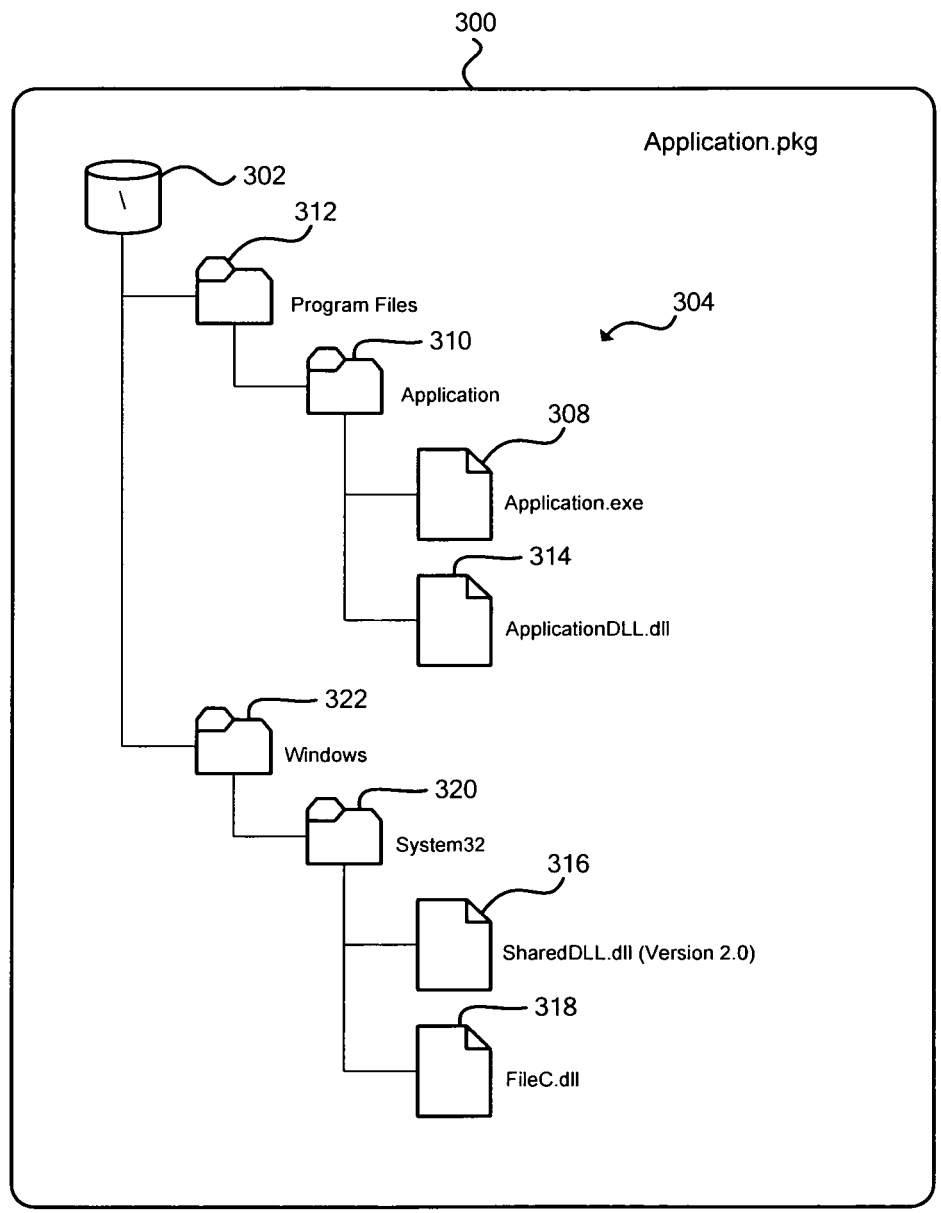
FIG. 3 is a diagram illustrating the contents of a package file suitable for use with a setup-free software application.

FIG. 3 is a diagram illustrating contents of a package file 300 suitable for use with a setup-free software application. In this example, package file 300 has the name "application.pkg" (where the extension PKG identifies the file as a package file that contains a setup-free application). Package file 300 may include a suitably arranged volume 302 having a root directory that includes a portion of a file system 304 and a portion of a registry for an executable application file 308. In this example, executable application file 308 may be included in an "Application" folder 310, which in turn may be included in a "Program Files" folder 312. This folder 312 emulates the actual "Program Files" folder that resides on the computing system (see FIG. 12). Application folder 310 may also include application DLLs (ApplicationDLL.dll) 314 corresponding to executable application file 308. Application DLLs 314 represent DLLs that are virtualized when package file 300 is opened. Package file 300 may include at least one shared DLL 316 and/or at least one file DLL 318 for executable application file 308. Notably, shared DLL 316 (identified as Version 2.0 in FIG. 3) represents a DLL that would normally be shared by multiple installed applications. Shared DLL 316, however, is isolated from all other versions of itself, which may be actually installed on the host computing system. Thus, when the contents of package file 300 are virtualized, shared DLL 316 will be accessed only in connection with the running of executable application file 308, while the installed version of the same DLL (whether it is Version 2.0, an older version, or a newer version) will be accessed in connection with the running of other applications. These items may be included in an appropriate folder of package file 300. In this example, these items are included in a "System32" folder 320, which in turn is included in a "Windows" folder 322. Folder 320 emulates the actual "System32" folder that resides on the computing system (see FIG. 12).

Although not separately depicted in FIG. 3, the portion of the registry contained in package file 300 may include registry keys and other registry elements organized in a manner that emulates the actual registry of the host computing device. As described in more detail below, the structure, arrangement, and nomenclature of the contents of package file 300, including the portion of the file system 304 and the portion of the registry, may be suitably designed for compatibility with the host computing system and/or the operating system of the host computing system.

A package file having a setup-free application may be authored using any suitable authoring tool, mechanism, or program. For example, the empty shell of a package file can be populated with the desired files and components, including portions of the registry, portions of the file system, the executable application file, the necessary mapping parameters, an initialization component, and possibly other files. In practical implementations, it may also be desirable to sign or mark the package file with some type of certificate of authenticity for purposes of security. The package file may also be write protected in some manner to ensure that its contents cannot be altered or compromised. A package file having a setup-free application may be distributed in any known manner. For example, a package file may be distributed via: downloading; a storage media such as a CD or any optical disk; mounting of a portable memory device such as a USB flash memory device; or the like.

Servicing and updating of a package file is relatively straightforward. For example, a new version of the setup-free application can be included in a new package file, the new package file can be distributed, and the existing package file can be overwritten with the new package file. Alternatively, a suitable patch application can analyze the existing package file and update its contents as necessary. Such updates may include the replacement of DLLs and other files contained in the package file. As a part of this process, the package signature may also be updated to ensure the authenticity of the modified package.

Moreover, an embodiment may be configured with the ability to mount multiple package files in a layered fashion. In this manner, a package file could be "updated" without actually modifying it; an update patch could be distributed as a separate package file. With multiple layered package files, one or more additional package files could be loaded and mapped on top of the "original" version of the package file. Using this technique, the computing system could easily perform a rollback of an undesirable patch (by simply deleting it). A suitably configured mechanism could be utilized to bind layered package files together, and configuration information could be employed to ensure that the related package files are automatically layered in the proper order when the executable application file is invoked. In practice, the operating system of the host computing system may include some form of authentication mechanism with certificates to ensure that only patch packages signed with an appropriate certificate (e.g., the same certificate) can be layered on top of another package file. For example, if the original package file includes an email application and a signed certificate, then any layered update package will share the same signing certificate.

Computing System Elements

Figure 4:
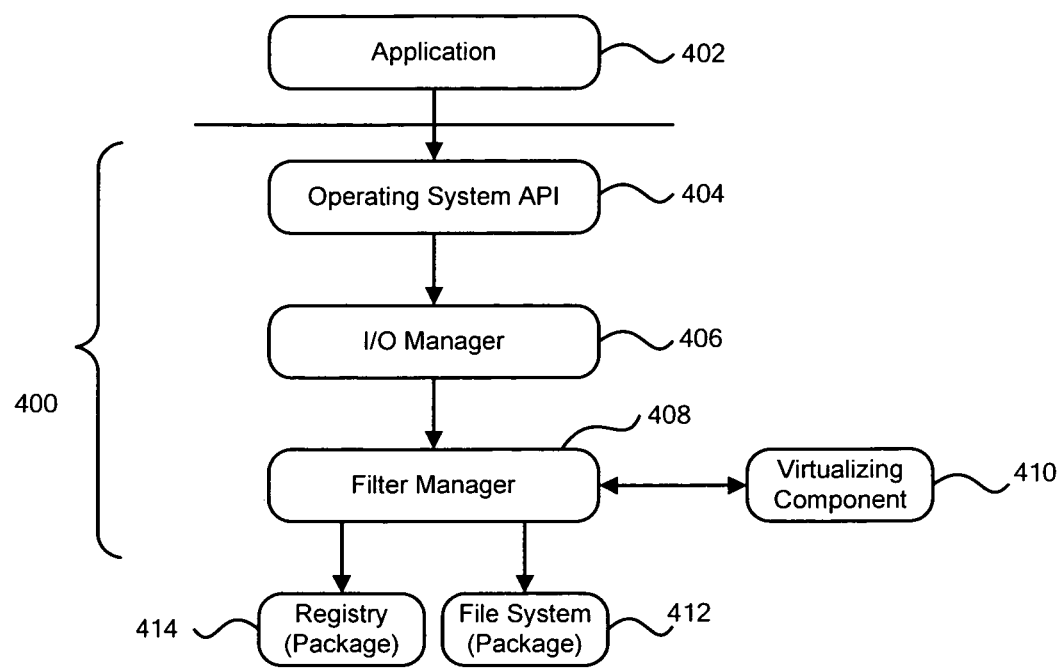
FIG. 4 is a schematic representation of an application and kernel mode components for a computing system configured to handle setup-free software applications.

In a practical implementation, a package file as described in the preceding section cooperates with the host computing system to support setup-free software applications in the manner described herein. In one example embodiment, the operating system of the host computing system is suitably configured for compatibility with such package files. In this regard, FIG. 4 is a schematic representation of a setup-free application 402 and kernel mode components 400 for a computing system configured to handle setup-free software applications. This logical representation may be implemented with any suitably configured piece of hardware, such as, for example, computer system 100 (see FIG. 1 and related description). A practical computing system may include additional components, logical elements, hardware, software, and/or firmware associated with conventional features of the computing system.

In this example, application 402 is a setup-free software application that is distributed in a package file as described above. Kernel mode components 400 are operating system level components that run in the kernel mode of the computing system. Kernel mode components 400 may include, without limitation: an operating system API 404; an input/output manager 406; a filter manager 408; and a virtualizing component 410. Kernel mode components 400 may communicate with one another as depicted in FIG. 4 as needed to support the running of application 402. In this regard, running of application 402 may involve a virtualized file system 412 that is contained in the package file corresponding to application 402 and/or a virtualized registry 414 that is contained in the package file corresponding to application 402. Such communication may be related to the handling of operating requests for file open operations, file read operations, file write operations, registry read operations, registry write operations, and the like. In a working implementation, the elements depicted in FIG. 4 may also communicate in the reverse direction; single arrows are shown for simplicity and for consistency with the examples described below.

Operating system API 404 and input/output manager 406 may be configured to operate in a conventional manner. Briefly, operating system API 404 resides between application 402 and input/output manager 406, and it functions to marshal operations (input/output operations in this case) from user mode to kernel mode. It may include validation of the API parameters. Input/output manager 406 resides between operating system API 404 and filter manager 408, and it handles input and output requests, commands, and instructions for application 402. The purpose of filter manager 408 is to direct input/output requests to installed filters based on what operations they have registered to receive. Filter manager 408 functions the same whether a given filter is present or not. It is the filter itself that does the unique work of implementing its functionality. In practice, operations go to filter manager 408, which sends them to the given filter. After processing by the given filter, the operations are returned back to filter manager 408, which then can communicate with the underlying file system. Thus, when setup-free application 402 is running, filter manager 408 can direct requests from input/output manager 406 to virtualizing component 410. In contrast, when a traditionally installed application is running, filter manager 408 may handle such requests in a different manner, while bypassing virtualizing component 410.

Filter manager 408 may be an optional component in a computing system embodiment that runs setup-free applications. Indeed, the functionality of filter manager 408 and the functionality of virtualizing component 410 may be combined into a single logical element or module. In this example, filter manager 408 is configured to monitor, regulate, and route requests, commands, and instructions from input/output manager 406 (and/or possible other kernel mode components) on an as-needed basis to virtualizing component 410. Regarding requests, commands, and instructions associated with traditionally installed applications, filter manager 408 may operate in a conventional manner to regulate, control, and manage any number of file system filter drivers (e.g., antivirus filters, or other file system filters). File system filter drivers may also be referred to herein as "filter drivers" or "filters." Filter manager 408 enables the host computing system to efficiently utilize various filters along with virtualizing component 410 as needed.

Virtualizing component 410 is suitably configured to direct operating requests, commands, and/or instructions associated with the operation of application 402 to file system 412 and/or registry 414. Virtualizing component 410 may be suitably configured to handle file system and registry operations. Although not depicted in FIG. 4, virtualizing component 410 can also view or analyze the results of operations in the reverse direction as they are completed. As mentioned above, file system 412 and registry 414 need not be installed (in the traditional sense) on the host computing system. Rather, file system 412, registry 414, and application 402 itself are included in the respective package file. Thus, virtualizing component 410 functions to virtualize the "installation" of application 402 because it enables application 402 to run even though it is not technically installed on the computing system. As described in more detail below, when application 402 is running, virtualizing component 410 maps items to their corresponding counterparts contained in the respective package file. Moreover, if a specific item has no counterpart in the package file, then virtualizing component 410 will communicate with the actual file system and/or the actual registry of the computing device. In other words, virtualizing component 410 need not exclusively direct all commands, requests, and instructions to the package file. For example, this feature may be utilized in connection with shared DLLs that are accessible to a plurality of applications (whether or not those applications are setup-free).

Although only one application 402 is described here in the context of FIG. 4, the concept can be extended to any number of setup-free applications, and virtualizing component 410 may be suitably configured to accommodate more than one setup-free application running concurrently. Thus, virtualizing component 410 can map items associated with any number of setup-free applications to any number of package files (the number of setup-free applications need not equal the number of package files; a single package file may contain and support more than one setup-free application). In practice, the mapping performed by virtualizing component 410 is temporary and exists on a per-process basis.

In a practical computing system environment, some files and items should not be virtualized. Such files and items may be, for example, fundamental operating system components and other components where it would be undesirable to have multiple versions available to the computing system. In this regard, the computing system may include a suitably configured component or module that can identify files and elements that should not be virtualized. In one embodiment, virtualizing component 410 may include this functionality. For example, virtualizing component 410 may maintain a list of exclusions that prevent virtualization or mapping to the contents of package files.

Virtualizing component 410 may be realized as a filter driver installed on the host computing system, where the filter driver is suitably configured to perform file and registry redirection in the manner described herein. In practice, virtualizing component 410 may employ a single filter driver having combined functionality that supports redirection to the virtualized file system 412 and redirection to the virtualized registry 414. Alternatively, virtualizing component 410 may employ one filter driver for redirection to the virtualized file system 412 and another filter driver for redirection to the virtualized registry 414. The following example assumes that virtualizing component 410 employs a single filter driver.

Virtualizing component 410 may be embodied as a non-device driver that is not associated with hardware (in contrast to a printer driver or other hardware drivers). In practice, virtualizing component 410 may be packaged with the operating system of the computing system or it may be distributed as a distinct component that is installed onto the computing system when needed. In this regard, virtualizing component 410 should be installed on the host computing system before launching a setup-free application contained in a package file. Once virtualizing component 410 is loaded, it is considered to be a part of the operating system because it operates in the kernel mode.

The operating system of the computing system may include additional features, components, or functionality to support the launching and running of setup-free applications. For example, package files as described herein may be named with a specific extension, e.g., PKG, to enable the operating system to distinguish such package files from other file types. Thus, the operating system may be modified with a suitable hook that facilitates launching of PKG files in the user interface program shell. Moreover, the operating system may be modified to enable the shell to otherwise handle PKG files (for example, opening PKG files, reading the contents of PKG files, passing mapping parameters to virtualizing component 410, etc.).

Running a Setup-Free Application

This section describes a typical scenario involving a setup-free application contained in a package file. This scenario reflects only one possible example to better illustrate a working environment; this example is not intended to limit or restrict the scope or application of the embodiments described herein.

Figure 5:
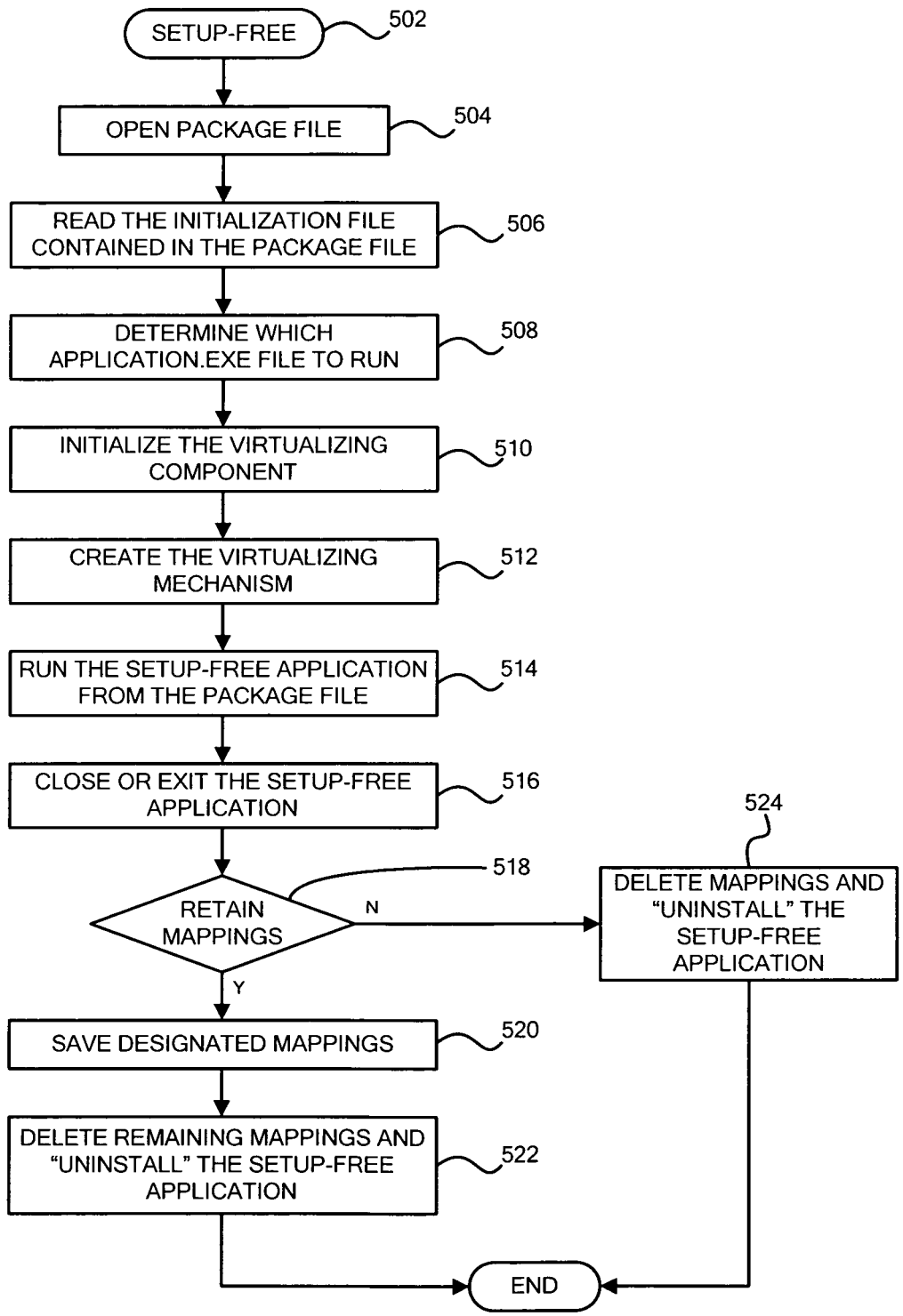
FIG. 5 is a flow chart that illustrates a setup-free process for running a setup-free application.

FIG. 5 is a flow chart that illustrates a setup-free process 502 for running a setup-free application contained in a package file. Process 502 assumes that a suitably configured virtualizing component is installed on the computing system, and that a package file including a setup-free application has been placed on the computing system without actually installing the application and without modifying the registry of the computing system. Process 502 also assumes that the computing system is attempting to run this particular setup-free application for the first time. The various tasks performed in connection with process 502 may be performed by software, hardware, firmware, or any combination thereof. For illustrative purposes, the following description of process 502 may refer to elements mentioned above in connection with FIGS. 1-4. In practical embodiments, portions of process 502 may be performed by different elements of the described system, e.g., a component contained in the package file, the virtualizing component, the operating system, the setup-free application itself, or the like. It should be appreciated that process 502 may include any number of additional or alternative tasks, the tasks shown in FIG. 5 need not be performed in the illustrated order, and process 502 may be incorporated into a more comprehensive procedure or process having additional functionality not described in detail herein.

Setup-free process 502 may begin when the package file is opened (task 504). Briefly, process 502 will then make an environment for the setup-free application appear on the computing system. The package file may be opened by clicking or double-clicking on a desktop icon corresponding to the package file (and/or corresponding to a setup-free application contained within the package file). Alternatively the package file may be opened via interaction with any suitable user interface feature. The opening of the package file initiates a dynamic, temporary, and virtual installation of a software application on the fly. In response to the opening of the package file, a component of the operating system (for example, the shell) reads the initialization component contained in the package file (task 506). By processing the initialization file, the operating system can determine which executable application file in the package file it is supposed to run (task 508). Task 508 enables the computing system to handle setup-free applications in different package files and to identify a specific setup-free application in a package file that contains multiple setup-free applications.

Also in response to the opening of the package file, the virtualizing component is initialized (task 510) such that it can perform the mapping and redirecting functions described herein. In one example, the shell passes the mapping parameters from the package file (see FIG. 2) to the virtualizing component. In another example, the computing system enables the virtualizing component to access the mapping parameters contained in the package file. In connection with this initialization, the virtualizing component may locate the file system elements, registry elements, and any other elements that will be virtualized. As depicted in FIG. 2, these elements are provided with the package file. Setup-free process 502 can then create and maintain the virtualizing mechanism (task 512) that will be utilized by the computing system to quickly access the contents of the package file. The virtualizing component may be considered to be a part of this virtualizing mechanism. Task 512 may be associated with different configuration settings depending upon the implementation, the functionality of the setup-free application, user preferences, system policies, and other operating conditions. Thus, task 512 may create the virtualizing mechanism in a manner that is influenced by certain policies that govern the opened package file. For example, task 512 may create the virtualizing mechanism in a manner that maintains mappings on a per-process (i.e., per-application) basis, or on a per-user basis. In one embodiment, the mapping is maintained on a per-process basis, such that two setup-free applications can have two different sets of files overlaid on the actual file system and registry. Consequently, the sets can coexist with no issues because each of the two setup-free applications will see its own set of files. For example, there can be two different setup-free applications having different mappings corresponding to a single DLL. The single DLL may be identical in both package files, or each package file may contain a different version of the DLL (this feature can be utilized to avoid file version conflicts). Moreover, two different setup-free applications may rely on a single DLL that is actually installed on the computing system.

Task 512 may create structures, mechanisms, paths, or the like, to support the techniques and technologies described herein. In one embodiment, the virtualizing component readies the mapping paths to the versions of the files contained in the package file, effectively overlaying the files and directories on the hard disk with the files and directories contained in the package file. A similar procedure is carried out to virtualize the registry contained in the package file. As mentioned above, the virtualizing component may be initialized with exclusions for files, directories, registry keys, and other items that should not be overlaid. Eventually, setup-free process 502 virtualizes the setup-free application to the rest of the volume of the computing system—from the perspective of the computing system, everything is actually installed. Thus, the virtualizing component will cooperate with the file directory of the computing system to make the virtualized application appear on the file directory. In addition, the virtualizing component can be configured to handle "file directory open" commands such that the computing system will be able to display the contents of the package file.

Moreover, the setup-free application runs from the package file (task 514) as though it is actually installed on the computing system. In practice, the virtualizing component handles real-time redirection of requests, commands, and instructions as needed when the setup-free application is running. In addition, the virtualizing component will be involved in communications with: the hard disk of the computing system; the actual file system of the computing system; the actual registry of the computing system; difference files maintained for the setup-free application (described below); and the like. In practice, the virtualizing component may communicate indirectly with the hard disk via the underlying file system.

Setup-free process 502 may also be utilized to close an application that has been virtualized. A setup-free application can be closed or exited (task 516) in response to user interaction with the application. Depending upon the implementation, certain settings, mappings, or other features of the virtualizing component may be retained by the computing system. For example, it may be desirable for some mappings to be semi-permanent to allow interaction among different setup-free applications. As another example, it may be desirable to retain some or all of the mappings such that tasks 510 and 512 need not be performed every time the setup-free application is subsequently launched. In this regard, the virtual file system and/or the virtual registry mapping can be preserved to save time when the setup-free application is reopened.

Thus, if setup-free process 502 is instructed to retain mappings (query task 518), then the computing system will save one or more designated mappings, settings, or other parameters associated with the virtualizing component and/or the virtualizing mechanism (task 520). These items can be saved in any appropriate location on the computing system. Thereafter, process 502 can delete the remaining mappings, settings, and parameters associated with the virtualization of the setup-free application (task 522). Task 522 effectively "uninstalls" the setup-free application. Consequently, the setup-free application is virtually installed on the computing system in a dynamic fashion and it appears on the computing system on an as-needed basis. Task 522 may be optional in that certain embodiments may be configured to retain mappings and leave them active after the setup-free application is closed or exited. In such embodiments, the setup-free application need not be "installed" and "uninstalled" every time it runs. If setup-free process 502 is not to retain mappings (query task 518), then process 502 will bypass task 520 and proceed to delete the mappings, settings, and parameters associated with the virtualization of the setup-free application (task 524), thus effectively "uninstalling" the application.

If the package file itself is deleted from the computing system, then the mappings, settings, and parameters associated with the virtualization of the setup-free application will be removed. As a result, little or no traces of the setup-free application and the virtualizing mechanism will remain on the computing system.

File Requests

Figure 6:
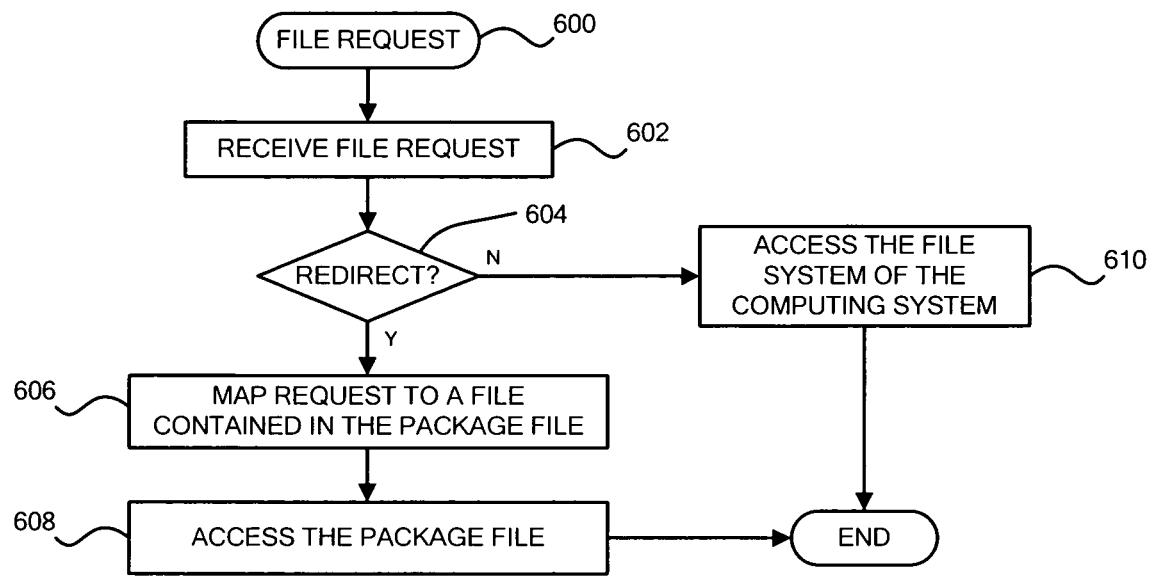
FIG. 6 is a flow chart that illustrates a file request process for a setup-free application.

Once a setup-free application has been virtualized, it may need to handle various commands, requests, and instructions. The virtualizing mechanism redirects file requests to the corresponding package file rather than to a location in the actual file system. FIG. 6 is a flow chart that illustrates a file request process 600 for a setup-free application. The various tasks performed in connection with process 600 may be performed by software, hardware, firmware, or any combination thereof. For illustrative purposes, the following description of process 600 may refer to elements mentioned above in connection with FIGS. 1-4. In practical embodiments, portions of process 600 may be performed by different elements of the described system, e.g., a component contained in the package file, the virtualizing component, the operating system, the setup-free application itself, or the like. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein.

File request process 600 may be performed for a file open operation or a file read operation that would ordinarily be directed to the actual file system of the computing system. A similar process can be performed for: file write operations, registry read operations, registry write operations, and possibly other operations. Process 600 assumes that a setup-free application has already been opened and virtualized on the computing system as described above in the context of setup-free process 502. Process 600 may begin by receiving a file request (task 602). In this example, the file request represents a request (generated by a setup-free application) to read the file identified as FileA.dll. In practice, this request will be received and handled by the virtualizing component.

File request process 600 may then perform a query task 604 to determine whether the requested file should be directed to the package file corresponding to the requesting setup-free application. If so, then the virtualizing component can map the file request to a corresponding file contained in the package file (task 606). In this manner, process 600 enables the computing system to access the package file (task 608) and, in particular, to process the virtualized version of the requested file that resides in the package file. For example, rather than accessing the requested file at C:\FileA.dll, the computing system may be directed to access the requested file at C:\Package.pkg\FileA.dll. Notably, even if a version of the requested file resides on the actual file system, process 600 will override the installed version and instead point to the virtual version contained in the package file. If the computing system has different versions of a requested file or an item, the setup-free application will default to the version that is contained in its package file, while other applications and the computing system itself will use the version that is actually installed on the computing system.

If a requested file is not supplied in the package file, or if the virtualizing component determines that the file request should not be redirected (query task 604), then file request process 600 may access the actual file system of the computing system (task 610) in an attempt to locate the requested file. For example, the operating system may attempt to access C:\FileA.dll as a backup measure.

Operation Examples

FIGS. 7-11 are diagrams that illustrate various operations associated with a setup-free application. These diagrams are intended to provide several examples of common operations associated with the running of software applications. In practice, a computing system may be required to perform additional or alternative operations that are not depicted in these diagrams. Some of the components and elements shown in FIGS. 7-11 were described above in the context of FIG. 4; these components and elements will not be redundantly described in this section.

Figure 7:
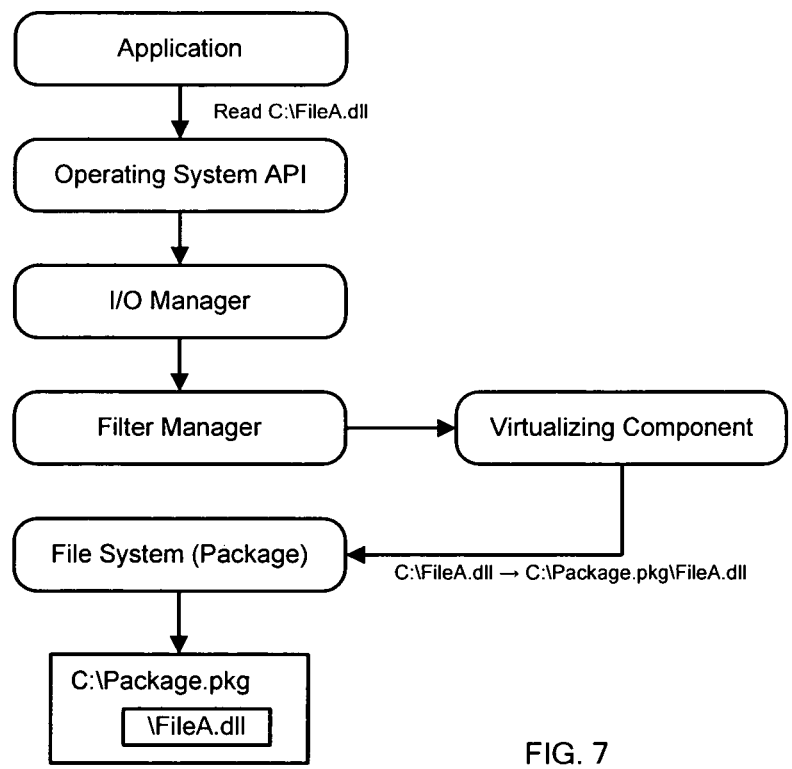
FIGS. 7-11 are diagrams that illustrate various operations associated with a setup-free application.

FIG. 7 depicts a file read operation for a setup-free application. A similar operation may be performed for file open operations. Here, the setup-free application generates a request to read a specific file (C:\FileA.dll in this example). This read request is eventually intercepted by the virtualizing component, which maps the request in an appropriate manner to the package file. In this example, the virtualizing component maps the request and redirects it to the reading part of C:\Package.pkg. As depicted in FIG. 7, the request is redirected to the virtualized file system contained in the package file. In turn, the virtualized file system accesses the requested file from the package file (C:\Package.pkg\FileA.dll). In contrast to this technique, a conventional file read operation would merely hand the file read request directly to the actual file system of the computing system to retrieve the requested file (C:\FileA.dll).

Figure 8:
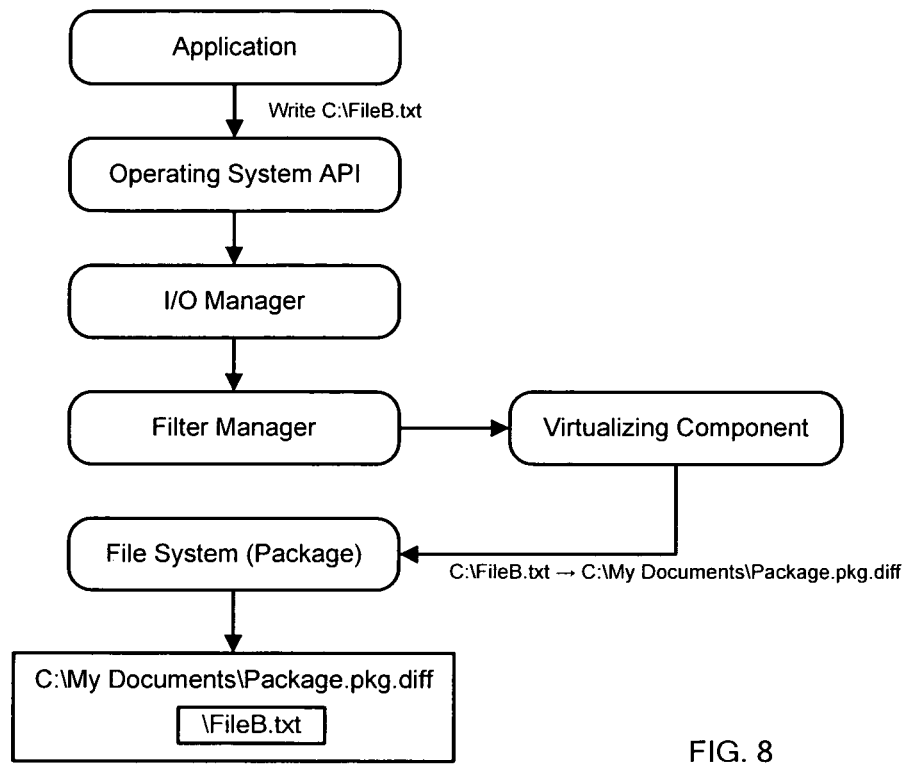

FIG. 8 depicts a file write operation for a setup-free application. The setup-free application generates a request to write a specific file (C:\FileB.txt in this example). This write request is eventually intercepted by the virtualizing component, which maps the request in an appropriate manner to the package file. In this example, the virtualizing component maps the write request such that it points to the writing part of a difference file maintained for the respective package file. In practice, package files may be write-protected and, therefore, a difference file (or any suitably formatted and configured file, location, or space) may be utilized to accommodate write requests. Here, the write request is mapped to the writing part of C:\My Documents\Package.pkg.diff. As depicted in FIG. 8, the request is redirected to the virtualized file system contained in the difference file. In turn, the virtualized file system writes the file to the specified location. In contrast to this technique, a conventional file write operation would merely hand the file write request directly to the actual file system of the computing system to write the requested file to a designated location (for example, C:\FileB.txt).

Figure 9:
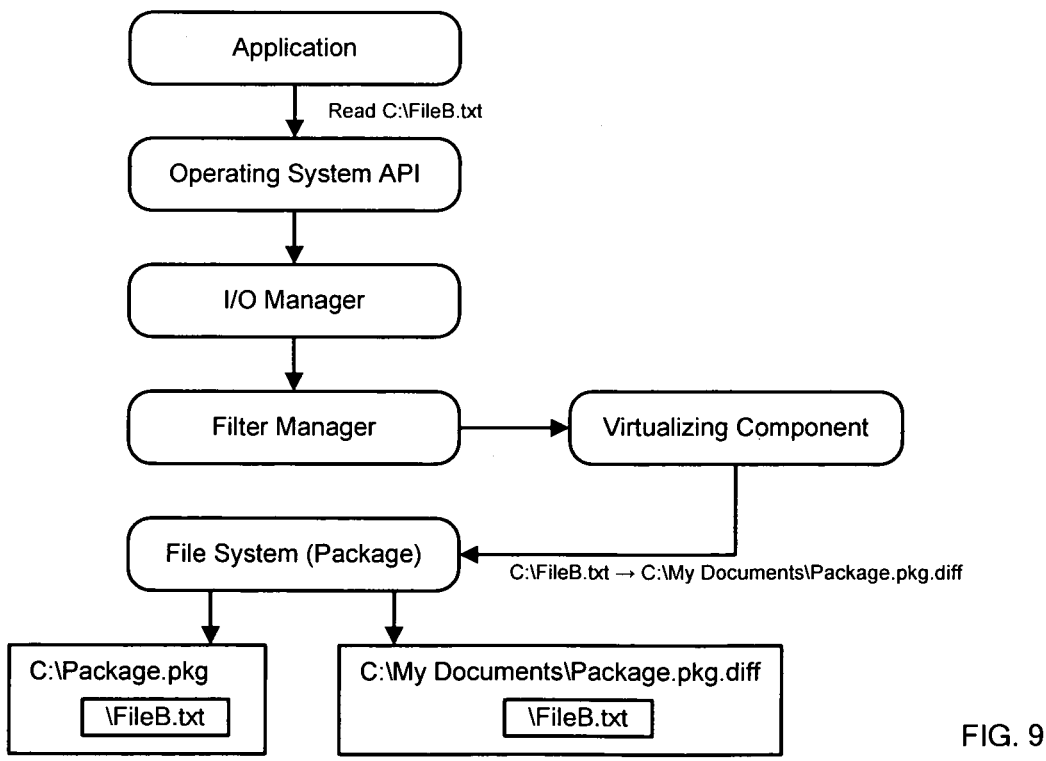

FIG. 9 depicts a file read operation for a modified file handled by a setup-free application. Here, the setup-free application generates a request to read a specific file (C:\FileB.txt in this example). This read request is eventually intercepted by the virtualizing component, which determines whether the requested file was previously written to. If not, then the request is handled in the manner described above in connection with FIG. 7. If so, then the virtualizing component maps the request in an appropriate manner. In this example, the virtualizing component maps the request to the reading part of C:\My Documents\Package.pkg.diff. In turn, the virtualized file system accesses the requested file from this designated difference file.

Figure 10:
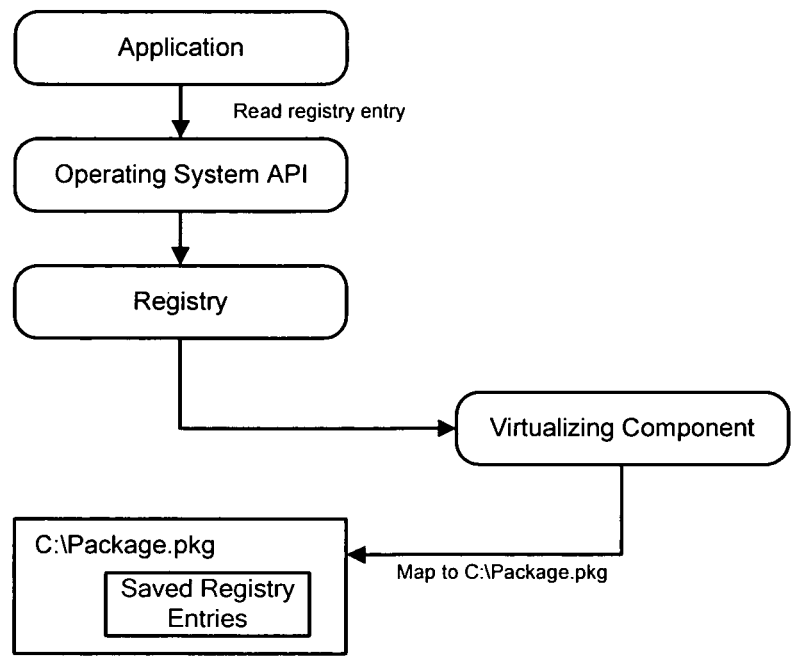

FIG. 10 depicts a registry read operation for a setup-free application. Here, the setup-free application generates a request to read a specific registry entry, such as a registry key. This registry read request is eventually intercepted by the virtualizing component, which maps the request in an appropriate manner to the package file. In this example, the virtualizing component maps the request and redirects it to the reading part of C:\Package.pkg. In particular, this mapping directs the request to the virtualized registry contained in the package file. As depicted in FIG. 10, the computing system will access the requested registry entry from the saved registry entries for the package file. In contrast to this technique, a conventional registry read operation would merely hand the registry read request directly to the actual registry of the computing system to retrieve the requested item.

Figure 11:
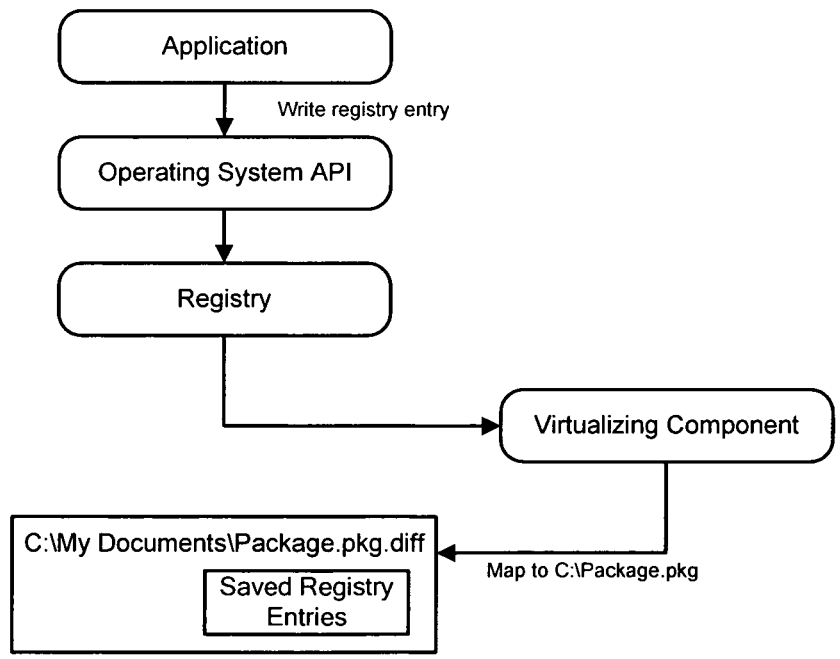

FIG. 11 depicts a registry write operation for a setup-free application. The setup-free application generates a request to write a specific registry entry, such as a registry key. This registry write request is eventually intercepted by the virtualizing component, which maps the request in an appropriate manner to the package file. In this example, the virtualizing component maps the registry write request such that it points to the writing part of a difference file maintained for the respective package file. In turn, the registry key is written to the difference file. In contrast to this technique, a conventional registry write operation would merely hand the registry write request directly to the actual registry of the computing system, resulting in a modification of the actual registry.

File System

As described above, a setup-free application can be dynamically and virtually installed on a computing system. The package file that includes the setup-free application is a file that will be recognized by the actual file system. After the package file is opened and the setup-free application is initialized, the computing system is "tricked" such that the setup-free application can run without actually being installed and without having to modify the actual registry of the computing system.

Figure 12:
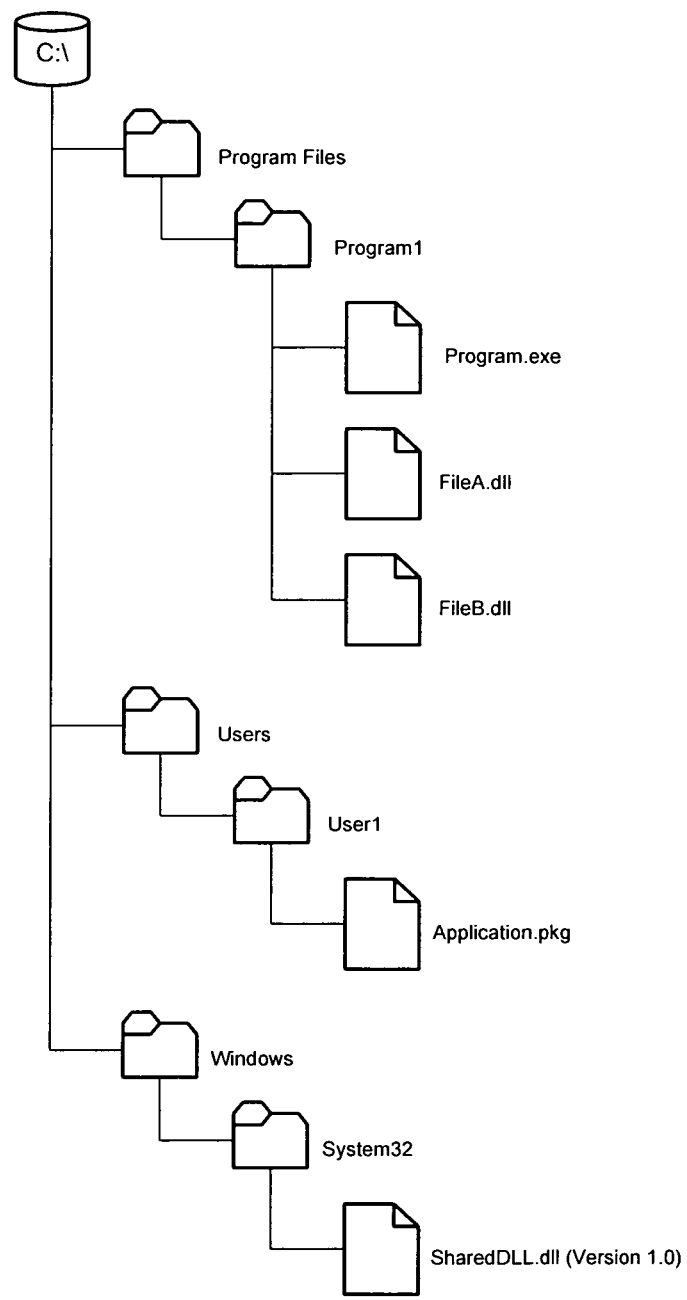
FIG. 12 is a diagram illustrating a file system as it appears to a computing system after initialization of a setup-free application.
Figure 13:
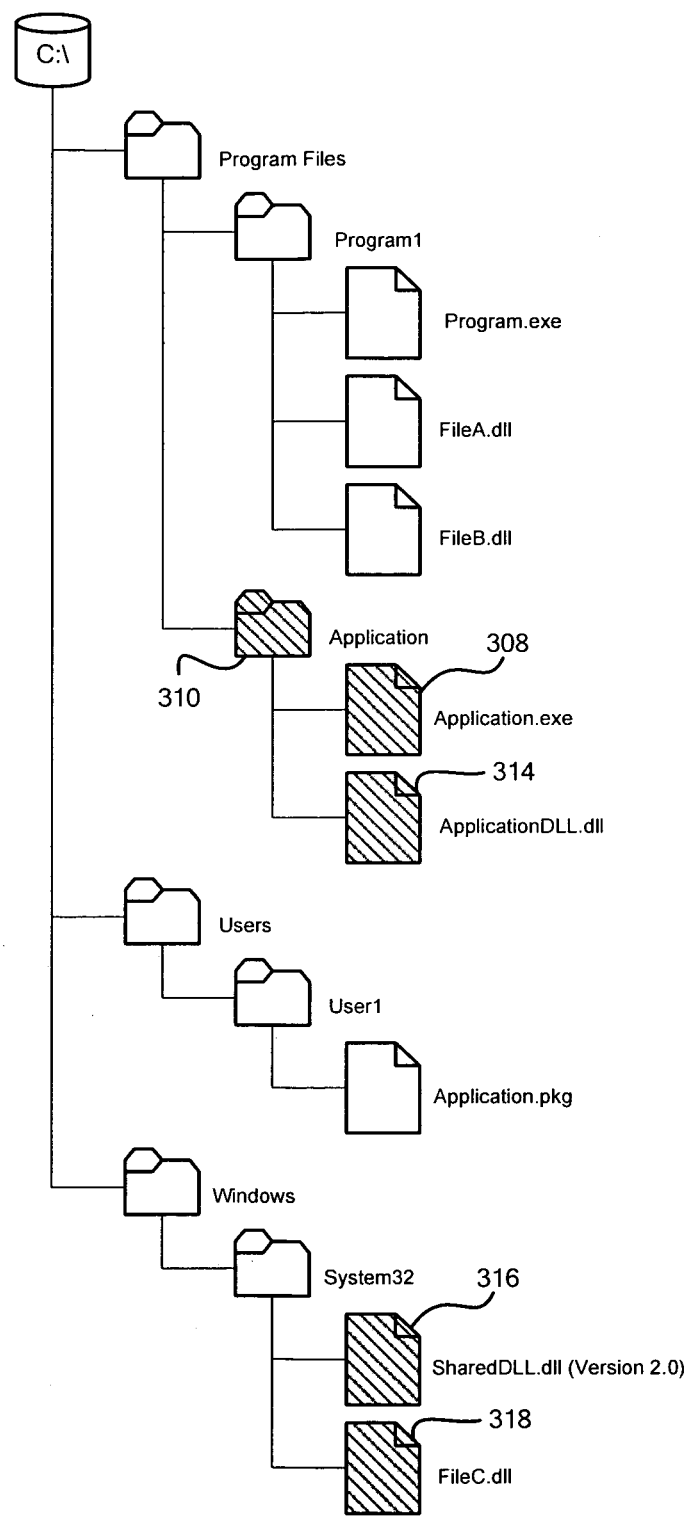
FIG. 13 is a diagram illustrating a file system as it appears to a setup-free application.

FIG. 12 is a diagram illustrating a portion of a file system as it appears to a computing system after initialization of a setup-free application, and FIG. 13 is a diagram illustrating a portion of a file system as it appears to a setup-free application. Referring again to FIG. 3, the contents of package file 300 are consistent with that shown in FIG. 12 and FIG. 13.

Referring to FIG. 12, the actual file system and traditionally installed components of the computing system will perceive the package file as an appropriately named file (Application.pkg). In this example, the package file is associated with a particular user of the computer system (User1). Moreover, FIG. 12 indicates that version one of a shared DLL (SharedDLL.dll) resides in the System32 folder.

In contrast, FIG. 13 represents the virtualized file system as perceived by the setup-free application when it is running. The shaded elements represent virtualized items that are contained in the package file. From this perspective, the application has its virtualized application folder 310 that contains the executable application file 308 and the application specific DLL 314. In this example, the package file includes version two of the shared DLL 316, which appears as a virtual entry under the System32 folder. Notably, version two of the shared DLL 316 will be utilized by executable application file 308 rather than version one (see FIG. 12). The DLL 318 also appears as a virtual entry under the System32 folder.

While at least one example embodiment has been presented in the foregoing detailed description, it should be appreciated that a vast number of variations exist. It should also be appreciated that the example embodiment or embodiments described herein are not intended to limit the scope, applicability, or configuration of the systems, methods, or devices in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for running a setup-free software application on a computing system, the method comprising:

opening a package file comprising an executable application file corresponding to an executable application, an initialization element indicating which executable application file should be run, file system elements for the executable application file, information indicative of a mapping from contents of the package file to program file locations of the computing system, application dynamic linked libraries corresponding to the executable application file, and registry elements for the executable application file;

initializing a virtualizing mechanism in response to opening the package file, the virtualizing mechanism comprising a list of exclusions that are indicative of elements in the package file that are not to be virtualized by the virtualizing mechanism;

preventing virtualization of an element of the package file based at least in part on the element being in the list of exclusions;

directing, by the virtualization mechanism, an operating request from the executable application file to the package file;

identifying the executable application file based at least in part on the initialization element; and running the executable application by loading the executable application file from the package file without installing the executable application file onto the computing system.

2. A method according to claim 1, wherein the operating request is a file read request.

3. A method according to claim 1, wherein the operating request is a file write request.

4. A method according to claim 1, wherein the operating request is a registry read request.

5. A method according to claim 1, wherein the operating request is a registry write request.

6. A method according to claim 1, wherein the package file includes parameters comprising information indicative of mappings corresponding to the file system elements for the executable application file.

7. A method according to claim 1, wherein the package file includes parameters comprising mappings corresponding to the registry elements for the executable application file.

8. A method according to claim 1, wherein:
the package file is configured to appear as a non-program file to the computing system.

9. A method according to claim 8, further comprising:
exiting the executable application file; and
maintaining at least one mapping for the virtualizing mechanism in response to the exiting.

10. A method according to claim 8, further comprising:
removing at least one mapping for the virtualizing mechanism in response to the package file being deleted.

11. A method for running a setup-free software application on a computing system, the method comprising:
opening a package file comprising an executable application file that is not installed on the computing system and application dynamic linked libraries corresponding to the executable application file, the package file comprising information indicative of a mapping from contents of the package file to program file locations of the computing system;
virtualizing the executable application file to the computing system in response to opening the package file, the virtualizing the executable application file comprising passing mapping parameters from the package file to a virtualization component and establishing mappings to items contained in the package file, the mapping parameters comprising information indicative of files and registry keys that will be virtualized, the mappings to items corresponding to the files and registry keys identified by the mapping parameters;
preventing virtualization of an element of the package file based at least in part on the element being in a list of exclusions maintained by the virtualization component;
receiving an operating request from the virtualized application;
directing the operating request to a difference file if the operating request corresponds to an item contained in the difference file; and
directing the operating request to the package file if the operating request corresponds to an item contained in the package file but not to an item contained in the difference file.

12. A method according to claim 11, further comprising directing the operating request to an actual file system of the computing system if the operating request corresponds to a file that is not contained in the package file.

13. A method according to claim 11, further comprising directing the operating request to an actual registry of the computing system if the operating request corresponds to a registry entry that is not contained in the package file.

14. A method according to claim 11, further comprising running the virtualized application from the package file without requiring administrator privilege.

15. A method according to claim 11, wherein virtualizing the executable application file comprises initializing a virtualizing component of the computing system.

16. A computer readable storage medium, excluding signals per se, having stored thereon computer executable instructions that, upon execution by a computer, cause the computer to at least:
open a package file comprising an executable application file not installed on the computer, a resource that supports execution of the executable application file, and information indicative of a mapping from contents from the package file to program file locations of the computer;
identify the executable application file by based at least in part on an initialization element located within the package file to a user interface of the computer;
start the executable application without copying the executable application file or the resource to a location external to the package file;
initialize a virtualizing mechanism in response to opening the package file, wherein the virtualizing mechanism does not virtualize at least one element of the package file based at least in part on the element being in a list of elements excluded from being overlaid;
cause a write request directed at the resource to write to a difference file;
determine that a read request directed at the resource corresponds to a previous write request; and
cause the read request to read from the difference file.

17. The computer readable storage medium of claim 16, excluding signals per se, in which the package file is a read only file.

18. A computing system comprising:
a processor;
a computer readable storage medium; and
an operating system having instructions that, when executed, cause the computing system to:
open a package file, the package file comprising an executable application file that is not installed on the computing system, a library file corresponding to the executable application file, and information indicative of a mapping from contents of the package file to program file locations of the computer readable storage medium;
virtualize the executable application file in response to opening the package file by at least passing mapping parameters from the package file to a virtualization component of the operating system, the mapping parameters comprising information indicative of files that will be virtualized, wherein the virtualization component establishes mappings to files contained in the package file and prevents virtualization of a file contained in the package file based at least in part on the file being in a list of exclusions;
receive an operating request from the virtualized application;
direct the operating request to a difference file if the operating request corresponds to a file contained in the difference file; and
direct the operating request to the package file if the operating request corresponds to a file of the package file but not to a file contained in the difference file.

* * * * *